United States Patent [19]

Shindoh et al.

[11] Patent Number: 5,643,980
[45] Date of Patent: Jul. 1, 1997

[54] FLAME RETARDANT THERMOPLASTIC RESIN COMPOSITION

[75] Inventors: Masuo Shindoh, Funabashi; Masayoshi Shirakawa, Fuchu-machi; Noriaki Kohtoh, Tokyo; Atsumi Aoki, Onoda, all of Japan

[73] Assignee: Nissan Chemical Industries Ltd., Tokyo, Japan

[21] Appl. No.: 573,862

[22] Filed: Dec. 18, 1995

Related U.S. Application Data

[63] Continuation of Ser. No. 283,259, Aug. 1, 1994, abandoned.

[30] Foreign Application Priority Data

Aug. 3, 1993 [JP] Japan ..................... 5-192295

[51] Int. Cl.$^6$ ..................... C08K 5/3435; C08K 5/3492
[52] U.S. Cl. ..................... 524/100; 524/381; 524/416
[58] Field of Search ..................... 524/100, 416, 524/381

[56] References Cited

U.S. PATENT DOCUMENTS

| | | | |
|---|---|---|---|
| 3,810,862 | 5/1974 | Mathis | 524/100 |
| 4,116,931 | 9/1978 | Minhas et al. | 524/381 |
| 5,124,379 | 6/1992 | Cipolli et al. | 524/100 |
| 5,153,245 | 10/1992 | Cipolli et al. | 524/100 |

FOREIGN PATENT DOCUMENTS 0 308 699  3/1989  European Pat. Off. .

OTHER PUBLICATIONS

J. P. Agrawal et al. "Zinc–Borate Complex as Flame–Retardant Filler", Journal of Applied Polymer Science, vol. 43, 373–377 (1991).

Chemical Abstracts, vol. 115, No. 8, AN–72920, Aug. 26, 1991.

*Primary Examiner*—Kriellion S. Morgan
*Attorney, Agent, or Firm*—Oblon, Spivak, McClelland, Maier & Neustadt, P.C.

[57] ABSTRACT

A flame retardant thermoplastic resin composition which comprises 100 parts by weight of a thermoplastic resin, from 1 to 30 parts by weight of (A) at least one of polyhydric alcohol-boric acid metal complexes, from 15 to 30 parts by weight of (B) at least one of ammonium polyphosphate and melamine-modified ammonium polyphosphate, and from 3 to 30 parts by weight of (C) at least one of melamine and melamine derivatives.

9 Claims, No Drawings

FLAME RETARDANT THERMOPLASTIC RESIN COMPOSITION

This application is a continuation of application Ser. No. 08/283,259, filed on Aug. 1, 1994, now abandoned.

The present invention relates to a flame retardant thermoplastic resin composition. More particularly, the present invention relates to a flame retardant thermoplastic resin composition having an excellent non-flammability and having such satisfactory various properties that a corrosive gas or a toxic gas is not generated, that molding processability is not low, and that mechanical strength of a molded product is not low.

A thermoplastic resin is generally excellent in electric properties and mechanic strength, and is therefore widely used for automobile parts, domestic electrical equipments and the like. However, since a thermoplastic resin is generally easily flammable, a satisfactory flame retardancy or non-flammability is required depending on its use, and the requirement of the flame retardancy or non-flammability becomes severe year by year.

In order to satisfy this requirement, various flame retardant thermoplastic resin compositions are proposed.

For example, a thermoplastic resin composition having an organic halogen type flame retardant and antimony oxide incorporated has a flame retardancy and a relatively satisfactory mechanical strength which is not lowered after being molded, but has a disadvantage that a corrosive gas or a toxic gas is generated during molding or burning. Accordingly, it is proposed in Japanese Unexamined Patent Publication No. 110738/1985 that a non-halogen type flame retardant such as a metal hydroxide including aluminium hydroxide or magnesium hydroxide is used for polypropylene resin in place of the organic halogen type flame retardant. However, in order to make the polypropylene resin composition highly non-flammable by incorporating these metal hydroxides, a large amount of metal hydroxide must be incorporated, and as this results, molding processability and mechanical strength of a molded product become poor.

Also, there is a method for incorporating a char-forming additive as a non-halogen type flame retardant. The char-forming additive provides a flame retardant thick wall in the presence of fire, and intercepts oxygen from a base polymer, thereby preventing the polymer from burning.

This type of a char-forming agent often has an intumescence, and is reported to be an intumescent flame retardant agent.

For example, it is disclosed in Japanese Unexamined Patent Publication No. 108140/1978 that a combination of ammonium polyphosphate and pentaerythritol has a function as an expandable carbonized material-forming agent and provides a high flame retardancy, but it causes mold staining during injection molding and also causes bleeding of a molded product when it is incorporated into polypropylene resin since pentaerythritol is highly hygroscopic.

Furthermore, Japanese Unexamined Patent Publication No. 39394/1993 proposes an organic silicone compound, ammonium polyphosphate, pentaerythritol type flame retardant composition and the like, but a compound having a large number of hydroxyl groups such as pentaerythritol is generally easily soluble in water and it is not preferable to incorporate such a water-soluble material into polypropylene resin.

As mentioned above, a polyhydric alcohol such as pentaerythritol conventionally used as an intumescent char-forming agent, provides such problems as to cause mold staining during injection molding and to cause bleeding on the surface of a molded product.

The present inventors have studied and found that the above mentioned problems can be solved by incorporating a polyhydric alcohol-boric acid metal complex as a water-insoluble intumescent char-forming agent into a thermoplastic resin such as polypropylene, together with ammonium polyphosphate, melamine and the like. The present invention has been made on the basis of this discovery.

An object of the present invention is to provide a highly flame retardant thermoplastic resin composition having a satisfactory molding processability and an excellent mechanical strength without causing bleeding.

Thus, the present invention relates to a flame retardant thermoplastic resin composition which comprises 100 parts by weight of a thermoplastic resin, from 1 to 30 parts by weight of (A) at least one of polyhydric alcohol-boric acid metal complexes, from 15 to 30 parts by weight of (B) at least one of ammonium polyphosphate and melamine-modified ammonium polyphosphate, and from 3 to 30 parts by weight of (C) at least one of melamine and melamine derivatives.

The thermoplastic resin used in the present invention is a thermoplastic resin usable for blow molding, extrusion molding and injection molding, examples of which include polyethylene, polypropylene, polystyrene, polyphenylene ether, polycarbonate, ABS resin, and their copolymers, and a mixture of at least two thermoplastic resins. Among them, preferable examples of a thermoplastic resin include a polypropylene type resin such as propylene homopolymer, propylene-ethylene copolymer, propylene-1-butene copolymer and propylene-1-pentene copolymer.

The polyhydric alcohol-boric acid metal complex used as Component A in the present invention is obtained by adding a water-soluble metal salt or a metal carbonate to the reaction product of boric acid and a polyhydric alcohol such as mannitol, sorbitol, dipentaerythritol and pentaerythritol. This compound is known as an unsaturated polyester flame retardant filler (J. P. Agrawal, Journal of Applied Polymer Science, 43 373(1991)).

An example of a water soluble metal salt includes a salt of the formula $M^n(CH_3COO)_n$ (n=2 or 3) wherein hydrogen of acetic acid is replaced by a metal. Examples of the metal (M) include Al, Ca, Co, Ni, Ba, Mg, Zn, Mn and the like. Examples of the metal of the carbonate include Ca, Mg, Ba, Zn, Mn and the like. The carbonate may be used as a basic salt. Among these metal compounds, compounds of Zn and Mg are preferable.

A polyhydric alcohol such as pentaerythritol is water-soluble, but it becomes water-insoluble and not hygroscopic when it is converted into a polyhydric alcohol-boric acid metal complex.

The polyhydric alcohol-boric acid metal complex is blended with a thermoplastic resin in an amount of from 1 to 30 parts by weight, preferably from 3 to 20 parts by weight, to 100 parts by weight of the thermoplastic resin.

If the amount of the polyhydric alcohol-boric acid metal complex blended is less than 1 part by weight, a satisfactory flame retardancy can not be obtained. On the other hand, if the amount of the polyhydric alcohol-boric acid metal complex exceeds 30 parts by weight, the improvement of the flame retardancy is small.

Ammonium polyphosphate and melamine-modified ammonium polyphosphate used as Component B in the present invention are commercially available, and the commercially available products can be used as they are. Examples of the commercially available ammonium polyphosphate include EXOLIT-422 (trade name, manufactured by Hoechst A. G.), Sumisafe-P (trade name, manufactured by Sumitomo Chemical Company, Ltd.), and the like, and examples of the commercially available melamine-modified ammonium polyphosphate include EXOLIT-462 (trade name, manufactured by Hoechst A. G.), Sumisafe-PM (trade name, manufactured by Sumitomo Chemical Company, Ltd.), and the like.

The ammonium polyphosphate or the melamine-modified ammonium polyphosphate is blended with a thermoplastic resin in an amount of from 15 to 30 parts by weight to 100 parts by weight of the thermoplastic resin. If the amount of the ammonium polyphosphate or the melamine-modified ammonium polyphosphate blended is less than 15 parts by weight, it is impossible to provide a flame retardancy of "V-0" with regard to a test sample of ⅛ inch thickness in UL-94 vertical burning test. On the other hand, if the amount of the ammonium polyphosphate or the melamine-modified ammonium polyphosphate blended exceeds 30 parts by weight, the improvement of the flame retardancy is small. The ammonium polyphosphate and the melamine-modified ammonium polyphosphate may be used in combination within the above mentioned amount range.

Melamine or melamine derivatives used as Component C in the present invention is blended with a thermoplastic resin, together with ammonium polyphosphate or melamine-modified ammonium polyphosphate, and is thermally decomposed by fire to generate a flame retardant gas and to form an expandable carbonized material, thereby intercepting oxygen from a base material. Examples of the melamine or the melamine derivatives include melamine, melem, melam, ammeline, ammelide, melamine cyanurate and the like.

The melamine or the melamine derivatives is blended with a thermoplastic resin in an amount of from 3 to 30 parts by weight, preferably from 5 to 20 parts by weight, to 100 parts by weight of the thermoplastic resin. If the amount of the melamine or the melamine derivatives is less than 3 parts by weight, a satisfactory flame retardancy can not be obtained. On the other hand, if the amount of the melamine or the melamine derivatives exceeds 30 parts by weight, the improvement of the flame retardancy is small. The melamine and the melamine derivatives may be used in combination within the above mentioned amount range.

Also, it is possible to incorporate usually used additives into a thermoplastic resin, examples of which include an antioxidant, a stabilizer, a pigment, a filler, a lubricant, a light stabilizer, and the like.

EXAMPLES

The present invention will be described in detail with reference to Examples. However, it should be understood that the present invention is by no means restricted to such specific Examples.

Example 1

10 l of distilled water, 680 g of pentaerythritol and 310 g of boric were charged in a 20 l reactor equipped with a stirrer, a refluxing apparatus and a thermometer, and a temperature was raised to a refluxing temperature and was maintained at the refluxing temperature for 50 minutes. Thereafter, a solution obtained by dissolving 659 g of zinc acetate in water was gradually added thereto, and the resultant mixture was reacted at the refluxing temperature for 30 minutes. After cooling the reaction mixture to room temperature, a product was filtrated out, and was dried in an oven at 100° C. for 10 hours to obtain 850 g of a white product. The product thus obtained was pulverized to obtain a polyhydric alcohol-boric acid metal complex powder (Component A). The above reaction was repeated twice to obtain about 1.7 kg of the metal complex powder.

1.5 kg of the above obtained polyhydric alcohol-boric acid metal complex powder (hereinafter referred to as "A1") as Component A, 3 kg of a melamine-modified ammonium polyphosphate (trade name: "EXOLIT462" manufactured by Hoechst A. G.) as Component B and 1.5 kg of a melamine cyanurate (trade name: "MC-490" manufactured by Nissan Chemical Industries, Ltd.) as Component C were blended with 15 kg of a polypropylene(trade name: J109G manufactured by Ube Industries, LTD.) to obtain a resin compound. The resin compound thus obtained was kneaded at a kneading temperature of 200° C. and melt-extruded by a twin-screw extruder to obtain pellets.

The pellets thus obtained were injection-molded by an injection molding machine having a cylinder temperature of 230° C. at the maximum to obtain a test sample for evaluation. At this time, the degree of mold staining caused during injection molding was evaluated, together with the following evaluations. The results are shown in the following Table 1.

(Evaluation Items)
1. Mold staining during injection molding
The degree of molding staining was usually evaluated by three ranks at the tenth shot since the initiation of injection molding of a resin compound of new composition.
○: A mold is not stained at all.
Δ: A mold is slightly stained.
X: A mold is badly stained.
2. Flame retardancy: UL-94
Flame retardancy was evaluated in accordance with "burning test of plastic materials for apparatus parts" of UL subject 94 (Underlighter Laboratories Incorporation).
3. Oxygen index
Oxygen index was evaluated in accordance with ASTM D2863.
4. Bleed resistance
Bleed resistance was evaluated by allowing an injection-molded product (70×45×3 mm) to stand at a temperature of 80° C. and at a moisture of 80% or less for 24 hours and visually evaluating the surface state of the products by three ranks.
○: Bleeding was not caused at all.
Δ: Bleeding was slightly caused.
X : Bleeding was badly caused.

Example 2

10 l of distilled water, 636 g of dipentaerythritol and 310 g of boric acid were charged in the same reactor as used in Example 1, and the resultant mixture was reacted in the same manner as in Example 1 to obtain 820 g of a dry product. The same reaction was repeated twice to obtain about 1.7 kg of a metal complex product.

The product thus obtained was pulverized to obtain a polyhydric alcohol-boric acid metal complex powder (Component A). 1.5 kg of the above obtained polyhydric alcohol-boric acid metal complex powder (hereinafter referred to as "A2") as Component A, 3 kg of Component B and 1.5 kg of Component C (Components B and C were the same as those used in Example 1) were blended with 15 kg of the same polypropylene as used in Example 1 to obtain a resin compound. The resin compound thus obtained was pelletized and injection-molded in the same manner as in Example 1. Various evaluations were made in the same manner as in Example 1, and the results are shown in the following Table 1.

Example 3

10 l of distilled water, 680 g of dipentaerythritol and 310 g of boric acid were charged in the same reactor as used in Example 1, and a temperature was raised to a refluxing temperature and was maintained for 50 minutes under fully stirring. Thereafter, 280 g of a basic zinc carbonate was added thereto, and the resultant mixture was reacted at the refluxing temperature for 30 minutes. The resultant mixture was cooled to room temperature, and a product was filtrated out and dried in the same manner as in Example 1 to obtain 750 g of a white product. The same procedure was repeated four times to obtain about 3 kg of the metal complex powder.

The product thus obtained was pulverized to obtain a polyhydric acid-boric acid metal complex powder (Component A). 2.25 kg of the above obtained polyhydric acid-boric acid metal complex powder (hereinafter referred to as "A3"), 3 kg of Component B and 1.5 kg of Component C (Components B and d were the same as those used in Example 1) were blended with 15 kg of the same polypropylene as used in Example 1 to obtain a resin compound. The resin compound thus obtained was pelletized and injection-molded in the same manner as in Example 1. Various evaluations were made in the same manner as in Example 1, and the results are shown in the following Table 1.

Examples 4 to 10 and Comparative Examples 1 to 13

As shown in the following Tables 1 to 5, Components A, B and C were blended with 100 parts by weight of a polypropylene to obtain the respective resin compounds in the same manner as in Example 1, and evaluations were made also in the same manner as in Example 1. In order to make comparison, pentaerythritol was used in place of Component A in Comparative Examples 4, 10 and 12. The results and blending ratios are shown in the following Tables 1 to 5.

TABLE 1

|  | Examples |  |  |  |
|---|---|---|---|---|
|  | 1 | 2 | 3 | 4 |
| Polypropylene *1 | 100 | 100 | 100 | 100 |
| Complex compound (A1) | 10 | — | — | 10 |
| Complex compound (A2) | — | 10 | — | — |
| Complex compound (A3) | — | 10 | 15 | — |
| EXOLIT462 *2 | 20 | 20 | 20 | 30 |
| MC *3 | 10 | 10 | 10 | 10 |
| Oxygen Index | 29.8 | 29.4 | 30.2 | 29.8 |
| UL-94 | V-0 | V-0 | V-0 | V-0 |
| Degree of mold staining | O | O | O | O |
| Bleed resistance | O | O | O | O |

*1; Trade name "J109G" of polypropylene manufactured by Ube Industries, Ltd.
*2; Trade name of melamine-modified ammonium polyphosphate manufactured by Hoechst A.G.
*3; Trade name "MC-490" of melamine cyanurate manufactured by Nissan Chemical Industries, Ltd.

TABLE 2

|  | Comparative Examples |  |  |  |  |
|---|---|---|---|---|---|
|  | 1 | 2 | 3 | 4 | 5 |
| Polypropylene *1 | 100 | 100 | 100 | 100 | 100 |
| Complex compound (A1) | — | 1 | 10 | — | — |
| Polyhydric alcohol *4 | — | — | — | 10 | — |
| EXOLIT462 *2 | 20 | 20 | 10 | 20 | — |
| MC *3 | 10 | 10 | 10 | 10 | — |
| Oxygen Index | 22.4 | 22.8 | 23.3 | 30.7 | 18.4 |
| UL-94 | HB | HB | HB | V-0 | HB |
| Degree of mold staining | O | O | O | X | O |
| Bleed resistance | O | O | O | X | O |

*1, *2, *3; The same as in Table 1
*4; Pentaerythritol

TABLE 3

|  | Examples |  |  |
|---|---|---|---|
|  | 5 | 6 | 7 |
| Polypropylene *6 | 100 | 100 | 100 |
| Complex compound (A1) | 10 | 15 | — |
| Complex compound (A3) | — | — | 10 |
| EXOLIT422 *7 | 20 | 20 | 20 |
| MC *3 | 10 | 10 | 10 |
| Oxygen Index | 30.2 | 30.6 | 29.9 |
| UL-94 | V-0 | V-0 | V-0 |
| Degree of mold staining | O | O | O |
| Bleed resistance | O | O | O |

*3; The same as in Table 1
*6; Trade name "J609H" of block copolymer manufactured by Ube Industries, Ltd.
*7; Ammonium polyphosphate manufactured by Hoechst A.G.

TABLE 4

|  | Comparative Examples |  |  |  |  |
|---|---|---|---|---|---|
|  | 6 | 7 | 8 | 9 | 10 |
| Polypropylene *6 | 100 | 100 | 100 | 100 | 100 |
| Complex compound (A1) | — | 10 | 10 | 1 | — |
| Polyhydric alcohol *4 | — | — | — | — | 10 |
| EXOLIT462 *7 | — | 20 | 10 | 20 | 20 |
| MC | — | — | 10 | 10 | 10 |
| Oxygen Index | 18.0 | 26.3 | 23.7 | 22.8 | 30.7 |
| UL-94 | HB | V-2 | HB | HB | V-0 |
| Degree of mold staining | O | O | O | O | X |
| Bleed resistance | O | O | O | O | X |

*6, *7; The same as in Table 3
*4; The same as in Table 2
*3; The same as in Table 1

TABLE 5

|  | Examples |  |  | Comparative Examples |  |  |
|---|---|---|---|---|---|---|
|  | 8 | 9 | 10 | 11 | 12 | 13 |
| Polypropylene *1 | 100 | 100 | 100 | 100 | 100 | 100 |
| Complex compound (A1) | 10 | 10 | 10 | — | — | 1 |
| Polyhydric alcohol *4 | — | — | — | — | 10 | — |
| EXOLIT462 *2 | 20 | 20 | 20 | 20 | 20 | 20 |
| Melamine *8 | 10 | — | — | 10 | 10 | 10 |
| Melem *9 | — | 10 | — | — | — | — |
| Melam *10 | — | — | 10 | — | — | — |
| Oxygen Index | 30.2 | 30.2 | 30.2 | 22.8 | 30.2 | 23.2 |
| UL-94 | V-0 | V-0 | V-0 | HB | V-0 | HB |

TABLE 5-continued

|  | Examples | | | Comparative Examples | | |
| --- | --- | --- | --- | --- | --- | --- |
|  | 8 | 9 | 10 | 11 | 12 | 13 |
| Degree of mold staining | Δ | O | O | Δ | X | Δ |
| Bleed resistance | O | O | O | O | X | O |

*1, *2; The same as in Table 1
*4; The same as in Table 2
*8, *9, *10; Manufactured by Nissan Chemical Industries, Ltd.

Example 11

10 l of distilled water, 680 g of pentaerythritol and 310 g of boric acid were charged in the same reactor as used in Example 1, and a temperature was raised to a refluxing temperature and was maintained for 50 minutes under fully stirring. Thereafter, 1000 g of an aqueous solution containing 150 g of magnesium acetate dissolved, was gradually added thereto, and the resultant mixture was reacted at the refluxing temperature for 30 minutes. The resultant mixture was cooled to room temperature, and a product was filtrated out and dried in the same manner as in Example 1 to obtain 630 g of a white product. The product thus obtained was pulverized to obtain a polyhydric alcohol-boric acid metal complex powder (Component A) of the present invention. The same reaction was repeated three times to obtain about 2 kg of the metal complex powder.

1.5 kg of the above prepared polyhydric alcohol-boric acid metal complex powder (hereinafter referred to as "A4") as Component A, 3 kg of Component B and 1.5 kg of Component C (Components B and C were the same as those used in Example 1) were blended with 3 kg of the same polypropylene as used in Example 1 to obtain a resin compound. The resin compound thus obtained was pelletized and injection-molded in the same manner as in Example 1. Various evaluations were made in the same manner as in Example 1, and the results are shown in the following Table 6.

Examples 12 to 15 and Comparative Examples 14 to 15

As shown in the following Tables 6 to 7, Components A, B and C were blended with 100 parts by weight of a polypropylene or an ethylene-propylene block copolymer to obtain respective resin compounds in the same manner as in Example 1, and evaluations were made also in the same manner as in Example 1. The results and blending ratios are shown in the following Tables 6 and 7.

TABLE 6

|  | Examples | | | | |
| --- | --- | --- | --- | --- | --- |
|  | 11 | 12 | 13 | 14 | 15 |
| Polypropylene *1 | 100 | 100 | 100 | — | — |
| Polypropylene *11 | — | — | — | 100 | 100 |
| Complex compound (A4) | 10 | 15 | 10 | 10 | 15 |
| EXOLIT462 *2 | 20 | 20 | 30 | 20 | 20 |
| MC *3 | 10 | 10 | 10 | 10 | 10 |
| Oxygen Index | 29.4 | 30.6 | 32.7 | 29.2 | 30.2 |
| UL-94 | V-0 | V-0 | V-0 | V-0 | V-0 |

TABLE 6-continued

|  | Examples | | | | |
| --- | --- | --- | --- | --- | --- |
|  | 11 | 12 | 13 | 14 | 15 |
| Degree of mold staining | O | O | O | O | O |
| Bleed resistance | O | O | O | O | O |

*1, *2, *3; The same as in Table 1
*11; Ethylene-propylene block copolymer; Trade name "J815HK" manufactured by Ube Industries, Ltd.

TABLE 7

|  | Comparative Example | |
| --- | --- | --- |
|  | 14 | 15 |
| Polypropylene *1 | 100 | 100 |
| Complex compound (A4) | 1 | 10 |
| EXOLIT462 *2 | 20 | 10 |
| MC *3 | 10 | 10 |
| Oxygen Index | 22.8 | 23.5 |
| UL-94 | HB | HB |
| Degree of mold staining | O | O |
| Bleed resistance | O | O |

*1, *2, *3; The same as in Table 1

The flame retardant and non-flammable thermoplastic resin composition of the present invention has a high flame retardancy, and does not generate a corrosive gas or a toxic gas during processing or burning and does not cause-mold staining during molding, and a mechanical strength of a molded product is not lowered, and bleeding of the molded product dose not occur. The resin composition of the present invention having such excellent properties as mentioned above, can be widely used for domestic electrical equipments, automobile parts, and the like.

We claim:
1. A flame retardant thermoplastic resin composition consisting essentially of:
   100 parts by weight of a thermoplastic resin;
   (A) from 1 to 30 parts by weight of at least one of polyhydric alcohol-boric acid metal complexes;
   (B) from 15 to 30 parts by weight of at least one of ammonium polyphosphate and melamine-modified ammonium polyphosphate; and
   (C) from 3 to 30 parts by weight of at least one of melamine and melamine derivatives.

2. The flame retardant thermoplastic resin composition according to claim 1, wherein the thermoplastic resin is at least one member selected from the group consisting of polyethylene, polypropylene, polystyrene, polyphenylene ether, polycarbonate, ABS resin, and their copolymers, and a mixture of at least two thermoplastic resins.

3. The flame retardant thermoplastic resin composition according to claim 1, wherein the thermoplastic resin is a polypropylene type resin.

4. The flame retardant thermoplastic resin composition according to claim 3, wherein the polypropylene type resin is at least one member selected from the group consisting of propylene homopolymer, propylene-ethylene copolymer, propylene-1-butene copolymer, and propylene-1-pentene copolymer.

5. The flame retardant thermoplastic resin composition according to claim 1, wherein the polyhydric alcohol of the polyhydric-boric acid metal complex is at least one member selected from the group consisting of mannitol, sorbitol, dipentaerythritol and pentaerythritol.

6. The flame retardant thermoplastic resin composition according to claim 1, wherein the metal of the polyhydric alcohol-boric acid metal complex is at least one member selected from the group consisting of Al, Ca, Co, Ni, Ba, Mg, Zn and Mn.

7. The flame retardant thermoplastic resin composition according to claim 1, wherein the polyhydric alcohol-boric acid metal complex is obtained by adding a water-soluble metal salt or a metal carbonate to the reaction product of a polyhydric alcohol and boric acid.

8. The flame retardant thermoplastic resin composition according to claim 7, wherein the water soluble metal salt is a metal acetate.

9. The flame retardant thermoplastic resin composition according to claim 1, wherein the melamine or melamine derivatives is at least one member selected from the group consisting of melamine, melem, melam, ammeline, ammelide, and melamine cyanurate.

* * * * *